INVENTOR.
GRAYSON F. WYLY

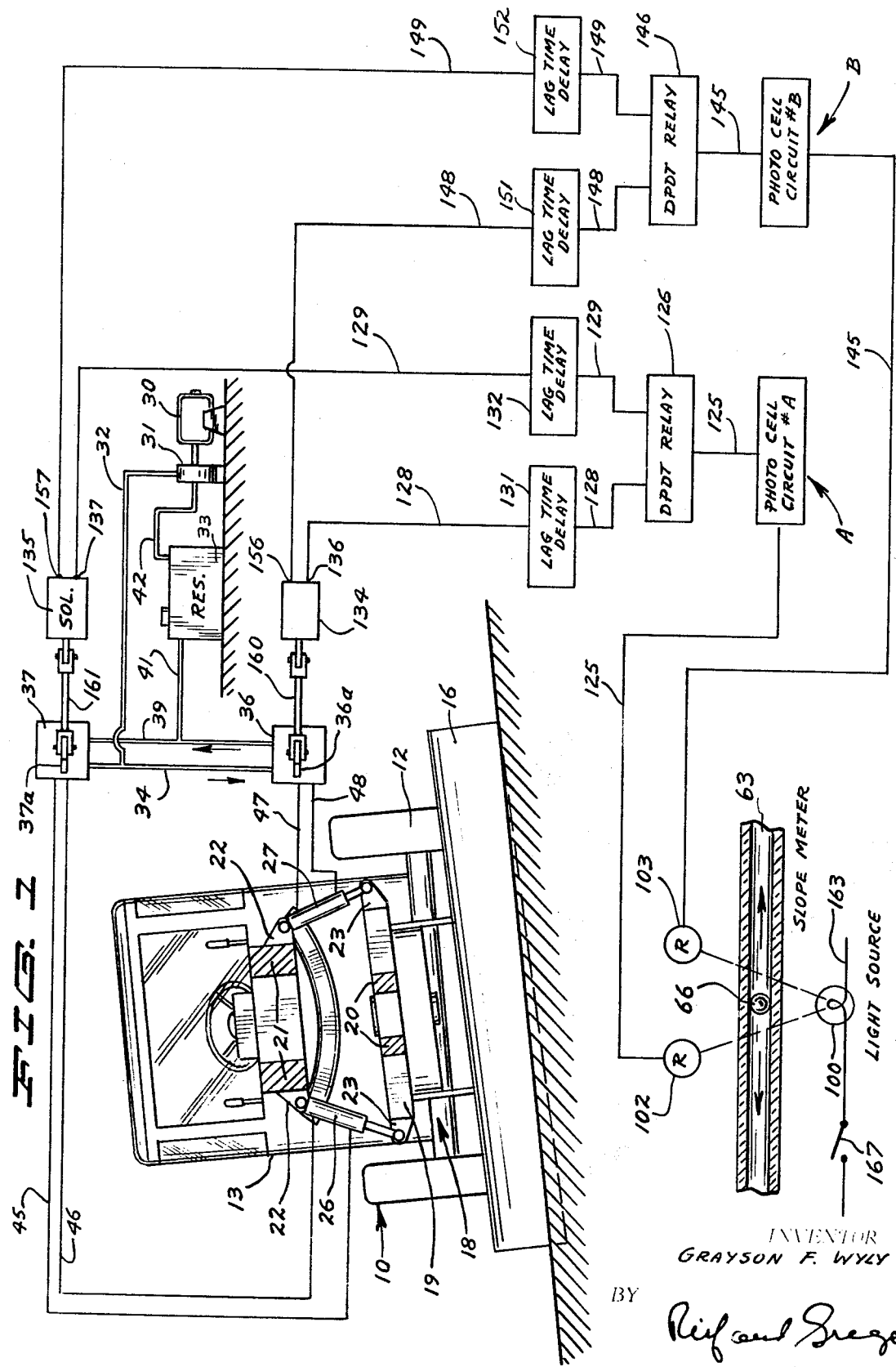

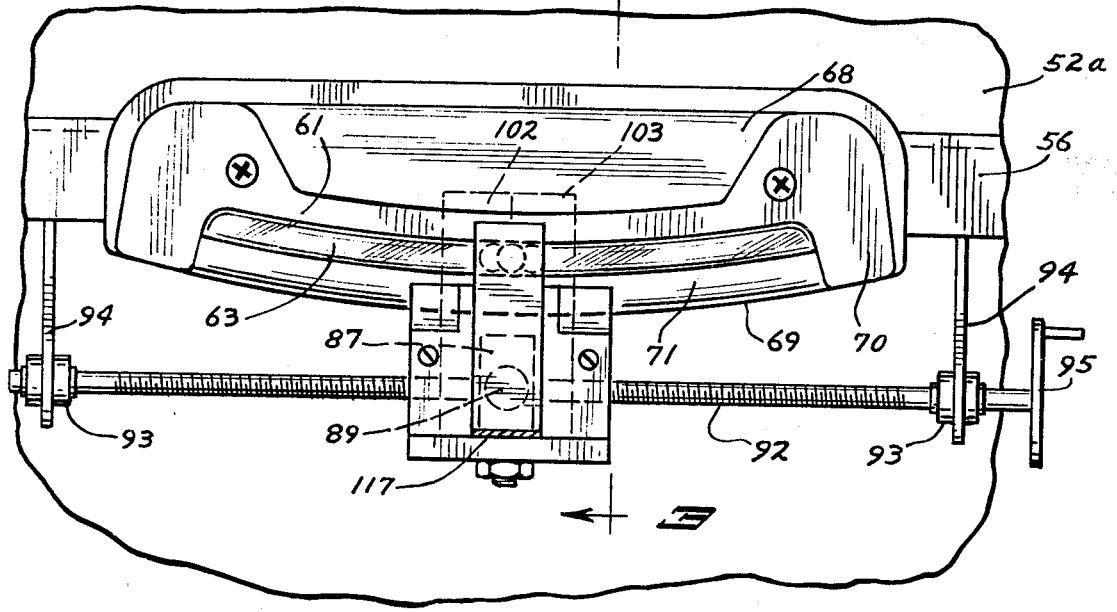
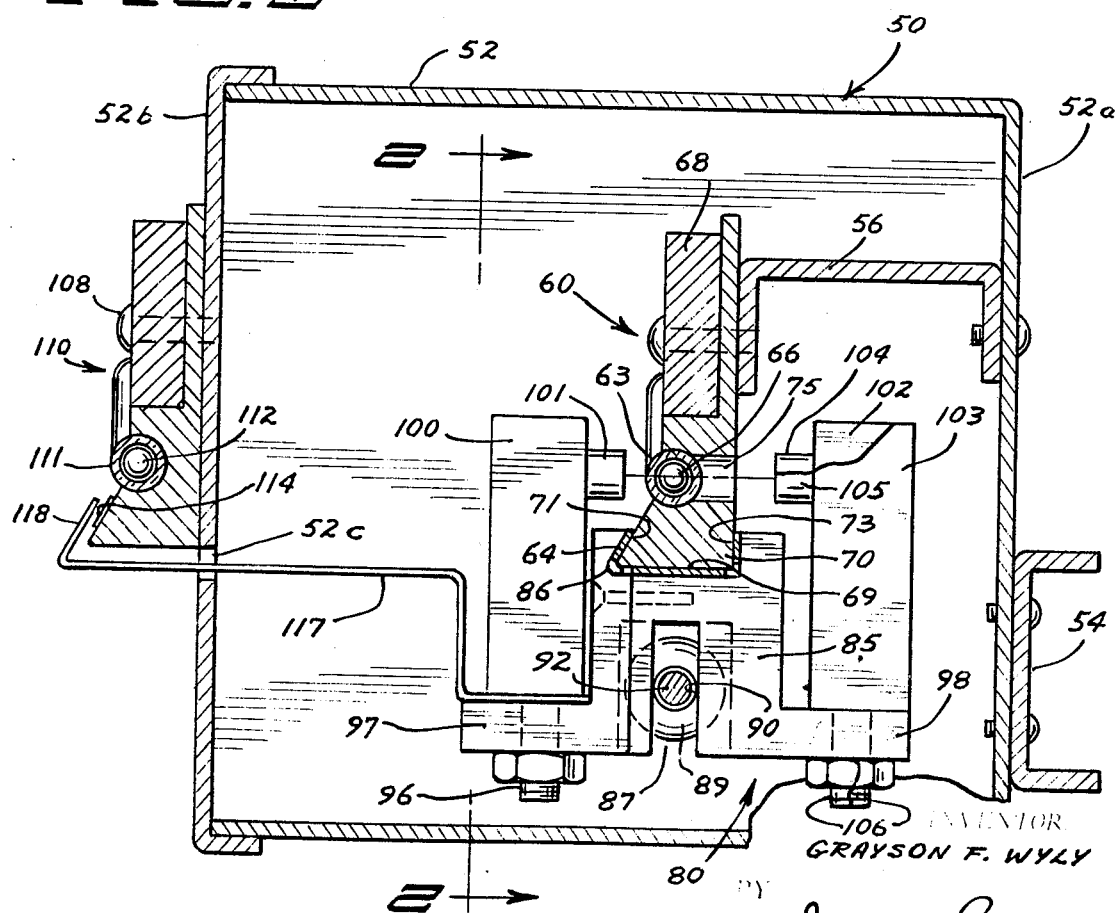

United States Patent Office 3,510,663
Patented May 5, 1970

3,510,663
RADIATION SENSITIVE GRADE INDICATING AND REGULATING DEVICE
Grayson F. Wyly, 6916 65th Ave. N., Minneapolis, Minn. 55428
Filed Oct. 21, 1968, Ser. No. 769,310
Int. Cl. H01j 39/12; E02f 3/76
U.S. Cl. 250—215                  9 Claims

ABSTRACT OF THE DISCLOSURE

An apparatus for use with a road grader to regulate the grading blade thereof consisting of a grading angle indicating meter, a pair of photocells responsive to changes in the reading of said meter beyond predetermined limits, said cells being included in a circuit including means to regulate and maintain the angle of said blade to provide a grade within said predetermined limits.

BACKGROUND AND SUMMARY OF THE INVENTION

This invention relates to an apparatus for use with slow moving vehicles such as road grading or road paving machines embodying the use of a grading blade wherein it is desired to regulate and maintain the angle of the grading blade within predetermined limits to provide a desired transverse grade or slope of a road bed.

Various devices are used to indicate to the operator the angle or slope of a road bed being graded and to provide manually operable means for regulation of the grading blade. The operator therefore is occupied not only with driving the vehicle but in addition must watch the slope indicating device and manually operate the mechanical means provided to regulate the blade. The desired angle of grade is not arrived at with one setting or with one cut of the blade into the road bed. The ultimate desired angle of grade is arrived at in increments through a series of cuts into the road bed.

It is desired to have means which will both indicate the angle of the grade as of a road bed being worked upon and which will also regulate the grading blade to maintain said grade within predetermined limits of a desired angle.

Generally stated, the invention herein comprises a slope indicating meter to be used as with a road grader to indicate the angle of the slope being graded and includes means to sense when the grade of the slope is beyond predetermined limits with respect to a predetermined meter setting, said sensing means being in circuit with hydraulic operating means to automatically regulate the angle of the grading blade to maintain the slope being graded within said limits of said meter setting.

It is an object therefore of this invention to provide means for automatically regulating and maintaining a grading blade to grade a slope at a desired angle.

It is another object of this invention to provide means to sense a change in the angle at which a slope is being graded and to regulate the grading blade to maintain the slope at a desired angle.

It is more specifically an object of this invention to provide for the regulation of a grading blade to maintain a slope at a desired grade without requiring the attention or the intervention of the operator.

These and other objects and advantages of the invention will be set forth in the following description made in connection with the accompanying drawings in which like reference characters refer to similar parts throughout the several views and in which:

FIG. 1 is a composite view showing a schematic diagram of the circuitry and the hydraulic system in connection with a vehicle shown in elevation, with some portions thereof being in vertical cross section;

FIG. 2 is a broken view in elevation taken on line 2—2 of FIG. 3 as indicated, showing a detail of the apparatus herein on an enlarged scale;

FIG. 3 is a view in vertical cross section taken on line 3—3 of FIG. 2 as indicated.

DESCRIPTION OF A PREFERRED EMBODIMENT

Figure 4:
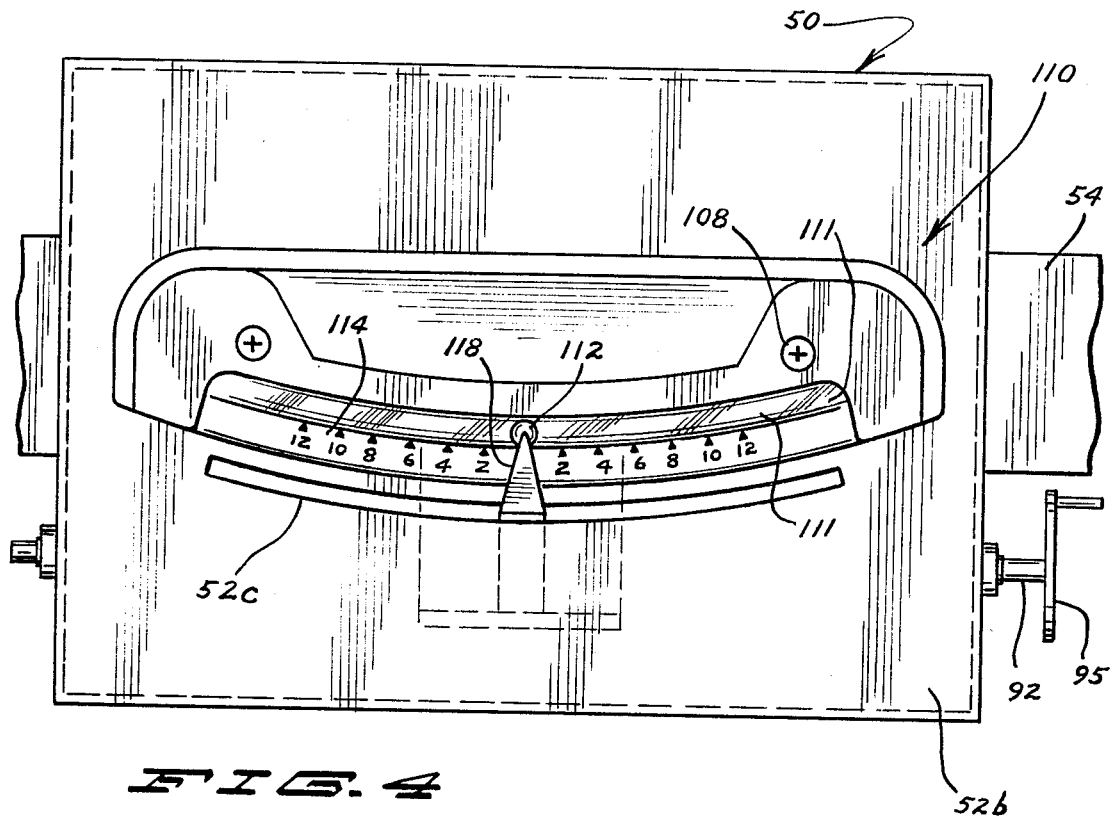
FIG. 4 is a view in front elevation of a portion of the apparatus.

With reference to the drawings, a machine 10 comprising a road grader of conventional design is indicated in FIG. 1, with sufficient structure thereof being shown for a disclosure of the subject matter of the invention herein in connection therewith. A grading blade is generally carried by the frame structure between the front and rear wheels. The chassis or frame structure of the machine is pivoted to the front wheel assembly and is supported by the rear wheel assembly. The rear wheels thus ride on the graded slope whereas the front wheels precede the grading of the slope. The portion of the machine 10 shown is in view of a vertical cross section of the machine taken behind the front wheels showing the rear wheel assembly 12 with the chassis 13 including the cab supported thereby.

A grading blade 16 is shown carried in front of the rear wheel assembly being supported and depending from a cross member assembly 18 including a cross member 19 and which is supported by longitudinal frame members 20. The blade 16 is pivoted with respect to a vertical axis in a known manner as by the use of a bull gear not here shown and which is not a part of the invention herein.

Extending above the cross member 19 are frame members 21. Carried by said frame members in alignment with said cross member 19 are plate brackets 22, and extending between said brackets and like brackets 23 at the ends of said cross member 19 are double acting hydraulic cylinders 26 and 27.

The cross assembly is constructed and arranged in a conventional manner to be pivotal transversely and the blade is integral in movement therewith. The blade is angled from the horizontal by the operation of said cylinders 26 and 27.

In connection with said hydraulic cylinders is a conventional pressurized hydraulic system shown here for the most part schematically and comprising a motor 30 and a pump 31 formed as an assembly and having therewith a reservoir 33.

A pressure line 32 runs from said pump to a connecting line 34 running to a pair of hydraulic valves 36 and 37. A by-pass or return line 39 runs from said valves to a line 41 running to said reservoir. A line 42 connects said reservoir with said pump. A pair of hydraulic lines 45 and 46 run from said valve 37 to the respective ends of the cylinder 26 and a pair of similar lines 47 and 48 run from said valve 36 to the respective ends of the cylinder 27.

It is a common practice for the controls with respect to said hydraulic cylinders to be manually operated. The subject matter of the invention herein comprises the automatic control and operation of said cylinders 26 and 27 by a very simple setting of an indicator on a slope indicating meter to achieve a desired transverse grade or slope, that is, the angle of the road bed from the crown thereof to the shoulder thereof.

The apparatus comprising the invention herein is indicated generaly by the reference numeral 50 with reference to FIG. 3, and is suitably carried by a housing 52 which may be generaly parallelepiped in form and will be secured to an appropriate frame member of said grader as by an angle bracket 54.

Carried within said housing and spaced from the inner rear wall 52a thereof as by a screw supported angled plate bracket 56 is a member 60 comprising as shown in FIGS. 2 and 3, a slope indicating meter having a face portion 61 carrying a liquid level 63 comprising an arcuate cylindrical liquid filled tube having a ball indicator 66 therein through which light will not pass. Said level will indicate the slope or angle of a grade with reference to the horizontal in a direction across the length of the grading blade, or, that is, transversely of the grader. Said ball indicator is of sufficient weight to rest on the bottom of the tube and will seek the lowest point thereof.

Said member 60 comprises an elongated body portion 68 having a longitudinally arcuate or curved bottom wall 69 and having below said level a lower body portion 70 having in cross section a forwardly downwardly and outwardly angled face 71 with said bottom wall 69 being at right angles to the rear wall 73. A slot 75 is formed in said body portion 68 at the rear of said level 63 and coextensive therewith for the passage of light through said level and slot. Said lower body portion provides a bearing surface as will be described and may have its face and bottom and rear walls coated with a relatively friction free material or self lubricating material such as nylon, as indicated by the reference numeral 64.

As will now be described, said lower body portion forms an overhead track or hanger from which is suspended a cradle 80 carrying a light source and a pair of photocell receivers.

Said cradle comprises a central upstanding body portion 85 having a transverse slot 86 in the top portion thereof to receive said lower body portion 70 and to be suspended therefrom for sliding engagement therewith. A cavity or chamber 87 is formed in the lower portion of said cradle which is indicated here as being parallelepiped in form, and disposed within said cavity is a ball 89, such as a nylon ball, and of such size as to have room for vertical movement within said cavity. Said ball has an internally threaded bore 90 therethrough and extending through said bore is a screw rod 92 journaled in bearings 93 adjacent either end thereof and supported by strap hangers 94 which may be suitably suspended from said plate bracket 56. A crank 95 is secured to one end of said screw rod and said crank and a rod portion adjacent thereto will be disposed outwardly of said housing 52.

Said cradle has a right-angled ledge portion 97 extending forwardly thereof and a like ledge portion 98 extending rearwardly thereof. Upstanding centrally of said forward ledge portion is a conventional electrically energized light emitting cell or light source 100 having a lens 101 focused in alignment with said tubular liquid level 63. Said cell 100 is suitably secured as indicated by a nutted bolt 96 depending through said ledge 97. Upstanding from said rearward ledge are a pair of conventional photocell receivers 102 and 103 spaced apart, as indicated in FIG. 1, to define the base of a triangle with respect to said light cell 100 and to have their light receiving elements 104 and 105 in direct alignment with said lens 101. Said lens 101 in a conventional manner will be arranged to emit a ray or beam of light to each of said receiving cells through said level 63. Said receivers will be secured to said ledge 98 as by nutted bolts 106 depending therethrough.

Thus rotation of the rod 92, which is axially stationary, will move said cradle across the length of said liquid level 63 to any desired point thereof.

Carried on the outer facing portion of the front wall 52b of said housing 52 and secured thereto as by a pair of spaced bolts 108 is a member 110 comprising a slope meter similar to said member 60 and in horizontal alignment therewith. Said member 110 comprises an arcuate tubular liquid level 111 having a ball indicator 112 therein. Extending below said level 111 and coextensive therewith is a plate member having indicia 114 thereon having readings in either direction from the center thereof to indicate degrees of slope or angle from the horizontal transversely of the road grader or of the surface being graded.

Extending forwardly of said cradle 80 from beneath said light cell 100 is the projecting end 118 of the pointer 117 extending through a narrow slot 52c in said front wall 52b. Said slot will underlie said member 110 and will describe an arcuate path corresponding to that of the arcuate bottom wall of said member 60 and of a corresponding bottom wall of said member 110.

Said pointer will indicate with its portion 118 a point with respect to the indicia 114 which will correspond to the position of said light cell 100 with respect to said liquid level tube 63.

Next the electrical circuitry in connection with the light source cell and photocell receivers will be described. The electrical circuitry is shown schematically and is described briefly as its components are conventional. The wiring of said circuitry is not shown at it is conventional with respect to the components shown.

The circuitry includes a photocell circuit A having a line 125 running from the photocell 102 to a double pole double throw relay 126 from which parallel lines 128 and 129 respectively run through lag time delay relays 131 and 132 to contacts 136 and 137 each of respective 2-way acting solenoids 134 and 135.

In like manner with respect to photocell circuit B, a line 145 runs from the photocell 103 to a double pole double throw relay 146 from which parallel lines 148 and 149 respectively run through lag time delay relays 151 and 152 to contacts 156 and 157 each of said respective 2-way acting solenoids 134 and 135.

Said solenoids respectively have mechanical linkage 160 and 161 to the control members 36a and 37a of said hydraulic valves 36 and 37.

The light source 100 will be in circuit with said photocells 102 and 103 as by line 163 and the entire circuitry will include a control switch 167. The light source cell and the photocell receiver circuits will be in parallel relationship.

OPERATION

The rear wheels and chassis of a road grader are pivotally connected to the front wheel assembly of the apparatus and the grading blade is carried by the chassis behind the front wheel assembly. Hence the front wheel assembly will precede the grading of a road bed and the rear wheels will ride on the graded road bed.

The final grading of a road bed is not accomplished by making a single cut of a road bed. A road bed is rough graded first and the final or fine grading or sloping is accomplished in small increments of one percent of grade or less at a time. Hence it is necessary to change the angle of slope or grade by successive small increments. The apparatus herein provides a simple and positive means for determining and regulating the fine grading or sloping of the road bed with respect to increments of small change. Grade in the sense as used herein and as previously indicated refers to the cross sectional profile of the road bed from the crown to the shoulder of the road.

The housing 50 will be mounted on the road grader at a place readily accessible to the operator for reading the slope meter 110 and for operating the control handle 95.

The apparatus 50 is mounted with reference to the rear wheels 12 whereby the ball indicator 112 and the corresponding ball indicator 66 will be at a zero reading with the rear wheels on a horizontal surface. The rear wheels in following the grading blade will cause the ball indicators to be positioned in their respective level tubes so as to indicate the grade being cut by the blade. There is sufficient lag or delay time in the circuitry to permit the rear wheels to come onto the surface being graded.

Hence in commencing an operation on a level surface, the ball indicator will be at a zero reading. The end portion 118 of the pointer 117 carried by the cradle 80 will be positioned by rotation of the screw rod 92 to indicate the degree of grade desired with reference to the indicia 114, such as a one percent grade. The rotation of said rod also moves the light source to a position which will correspond to that of said pointer. The photocell circuits A and B remain open or broken so long as the light beams from the light source to the photocells remain unobstructed. It will be understood that the slope meter 110 is read by the operator and that the use of the screw rod adjusts the light source with respect to the slope meter 60 to correspond with the position of the pointer 118 with respect to the reading of the slope meter 110. With respect to the light source 100, the photocell receivers are spaced apart a predetermined distance to provide permissive limits of deviation at either side of the desired reading. The switch 167 in "on" position energizes the system and in "off" position permits manual operation of the hydraulic cylinders, means for which are not here shown and are not part of the invention herein.

Now with respect to the final or fine grading, the grading blade initially will be set manually, and with the first cut of the road bed, as soon as the rear wheels ride upon the graded surface, the ball indicators respectively will be positioned at a reading to indicate the slope being cut. If the blade is correctly set, the ball indicator 66 will be positioned within the triangle defined by the light source 100 and the photocell receivers 102 and 103. It may be necessary to make a trial and error setting of the blade for final grading to have it positioned to grade a slope within the range of the setting of the indicator 118. The apparatus senses the slope being graded as indicated in effect by the plane upon which the rear wheels rest. Any change in this slope will cause the movement of the ball indicator 66 to interrupt the light beam to either the photocell receiver 102 or 103 as the case may be and the corresponding circuit will be energized to adjust the position of the blade to correspond to the angle of the desired grade. Hence if the ball indicator moves between the light source 100 and the photocell receiver 102 to interrupt the passage of light therebetween, the circuit A will be energized causing the solenoids 134 and 135 to activate the hydraulic cylinders 26 and 27 to tilt the blade 16 as to the operator's left. The correction will be made while the ball indicator 66 is obstructing said passage of light whereby said ball indicator is returned to the area defined by the light source and the pair of photocell receivers.

The ball indicator is arranged to be relatively slow moving within said tube 63 and the road grader itself is relatively slow in movement. The purpose of the apparatus is to make very fine adjustments for final road grading and is not intended for rough grading. It is intended to regulate increments of grading as within one percent of a desired slope. To final grade as more than one percent, the grader will have to traverse the area a second or a third time.

There is a substantial saving of time in fine grading in materially reducing the number of times a grader must traverse a given area as a very accurate slope is graded with the use of the described apparatus. There is also a substantial saving in paving material such as concrete or asphalt because of the accuracy of the grade with respect to the specification.

Lag time is included in the circuitry to permit the rear wheels to come upon a new grade without causing an adjustment of the blade as just described. The vehicle is slow moving and the ball indicator 66 is relatively slow moving and it is relatively large to obstruct a light beam for a sufficient length of time for correction to take place. There is sufficient lag time so that the angle of the blade may be adjusted while the machine is in motion. As indicated, the increments of change are small in the final grading of the road bed. This apparatus is not intended to correct a severe fault which may occur in a road bed.

It is emphasized that it is intended to provide sensitive control over the final or finish grading.

It is seen that each of the photocell circuits A and B actuate both solenoids causing them to operate oppositely whereby the respective hydraulic cylinders act oppositely in tilting the grader blade about a central axis normal to said blade.

For regulation of the grading blade for rough grading, the control switch will be placed in "off" position and the control members 36a and 37a will be arranged for manual operation.

Thus it is seen that there has been provided an apparatus which is sensitive to small differences in grade for the setting and regulation of a grading blade in fine grading or final grading as of a road bed.

It will be understood that various changes may be made in the form, details, arrangement and proportions of the parts without departing from the scope of the invention herein.

What is claimed is:
1. An apparatus regulating the grading blade of a road grader having in combination,
   means carried by said grader indicating a reading of the angle of slope being graded,
   means in connection with said means indicating a desired angle of slope to be graded,
   means in connection with said second mentioned means setting permissive limits of deviation from said desired angle of slope,
   said last mentioned means being responsive to a change in the reading of said first mentioned means in moving beyond said permissive limits, and
   means actuated by said last mentioned means to regulate the angle of said grading blade to grade a slope within said permissive limits of said desired angle of slope with respect to said second mentioned means.
2. The structure set forth in claim 1, wherein
   said first mentioned means comprises a level tube having a ball indicator therein, and
   indicia in connection with said tube.
3. The structure set forth in claim 1, wherein
   said first mentioned means includes a level tube having a ball indicator therein,
   said third mentioned means comprises
   a light source positioned to direct light through said tube, said light source being positioned to indicate said desired angle of slope to be graded with respect to said tube, and
   a pair of photocell receivers spaced apart longitudinally of said tube, each of said photocell receivers receiving a beam of light through said tube from said light source, said beams of light defining the permissive limits of deviation in the slope being graded with respect to the desired angle of slope.
4. The structure set forth in claim 3, wherein
   said photocells respectively are in circuit with said light source,
   means regulating said grading blade are in circuit with said photocells, and
   said circuitry is energized by said ball indicator interrupting one of said beams of light.
5. The structure set forth in claim 1, wherein
   said last mentioned means comprises a pair of electrical circuits including therein said third mentioned means,
   means carried by said grader regulating the angle of said blade, and
   means actuated by said respective circuits to actuate said means regulating said blade.
6. The structure set forth in claim 1, wherein
   said first mentioned means comprises a meter,
   an indicator with respect to said meter indicates the angle of slope desired to be graded,
   means adjusting said indicator, said third mentioned means comprises a light source and a pair of spaced photocells each receiving a beam of light from said light source, said light source being positioned with respect to said second mentioned means relative to said meter, said first mentioned means includes a ball indicator responsive to and indicating the angle of slope being graded, said ball indicator being positioned to pass between said light source and either of said photocells to interrupt the light beams therebetween, said ball indicator upon interrupting either of said light beams causes said third mentioned means to actuate said last mentioned means.

7. The structure set forth in claim 6, including means simultaneously positioning said indicator and said light source maintaining them in relatively like positions.

8. An apparatus regulating the grading blade of an apparatus such as a road grader having in combination, a meter comprising a level tube including a ball indicator indicating the angle of slope being graded, means indicating with respect to said meter a desired angle of slope to be graded, a light source positioned relative to said indicator, a pair of spaced photocells respectively receiving a beam of light from said light source, said photocells with said light beams forming the permissive limits of deviation from said desired angle of slope, means in connection with said meter interrupting one of said light beams as said angle of grade deviates from said desired angle, means regulating said grade blade, circuitry including said light source, said photocells and said regulating means, and said interrupting means energizing said circuitry for operation of said regulating means upon interruption of one of said light beams.

9. The structure set forth in claim 8, including means in connection with said apparatus carrying an indicator with respect to said meter and said light source and said photocells in fixed relation to one another, and means adjusting said last mentioned means with respect to said meter.

References Cited

UNITED STATES PATENTS

| | | | |
|---|---|---|---|
| 2,846,635 | 8/1958 | Shea | 172—4.5 X |
| 2,893,134 | 7/1959 | Shea et al. | 172—4.5 X |
| 2,999,939 | 9/1961 | Bible et al. | 250—203 X |
| 3,009,271 | 11/1961 | Kuhne et al. | 172—4.5 |

WALTER STOLWEIN, Primary Examiner

U.S. Cl. X.R.

172—4.5; 250—220